United States Patent Office 3,546,630
Patented Dec. 8, 1970

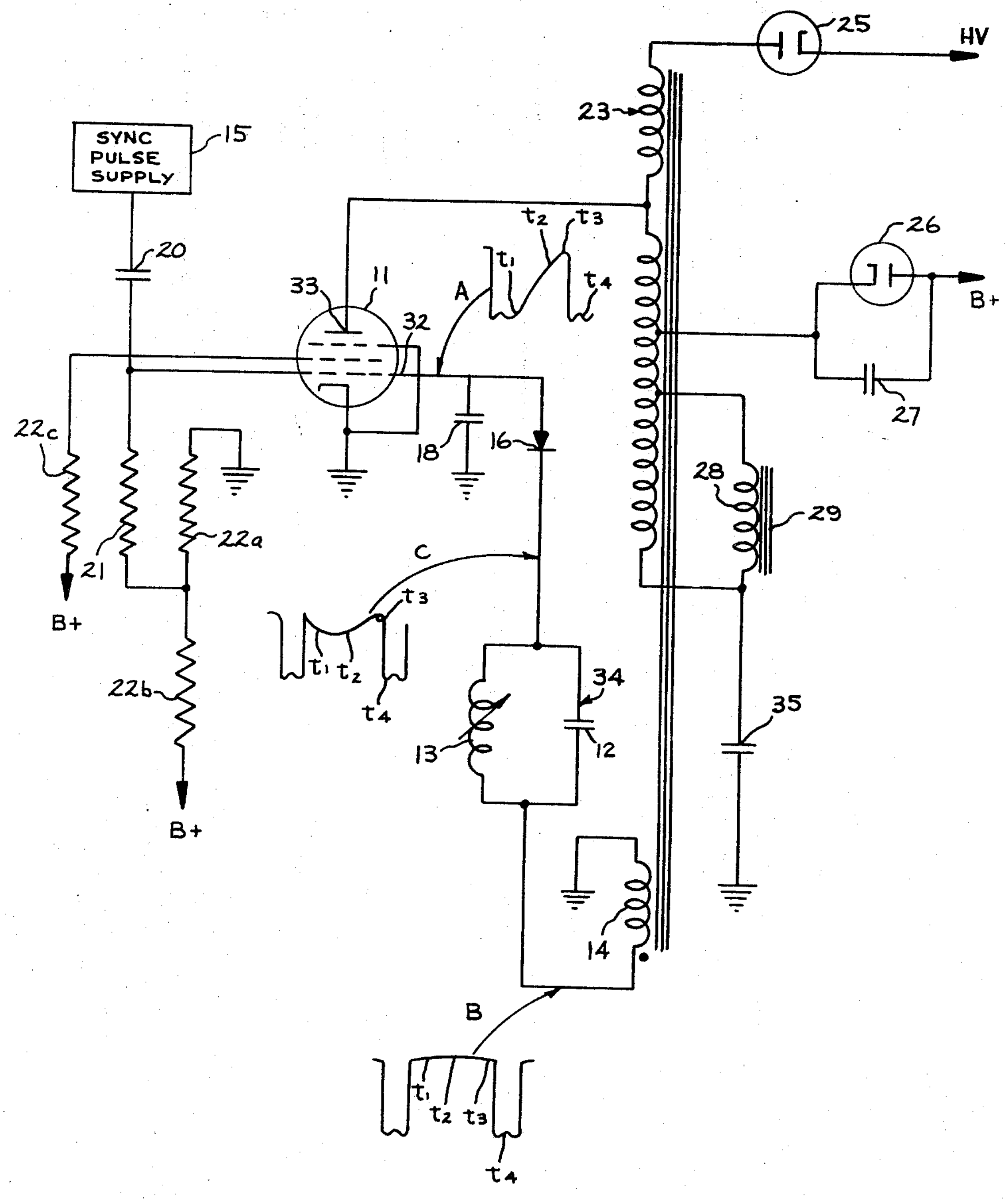
INVENTOR.
JOHN D. JORDAN
BY Francis H. Boos, Jr.
HIS ATTORNEY

3,546,630

SELF-OSCILLATING SWEEP CIRCUIT HAVING A RINGING CIRCUIT CONNECTED IN SERIES WITH A FEEDBACK WINDING

John D. Jordan, Chesapeake, Va., assignor to General Electric Company, a corporation of New York Filed Sept. 18, 1968, Ser. No. 760,649
Int. Cl. H03k 3/16
U.S. Cl. 331—147 3 Claims

ABSTRACT OF THE DISCLOSURE

A self-oscillating horizontal sweep circuit comprising a vacuum tube with the plate connected to a horizontal sweep autotransformer. A feedback winding is coupled to the autotransformer through a common core and to the grid of the vacuum tube through a feedback path comprising a diode, a ringing circuit, and a capacitor.

BACKGROUND OF THE INVENTION

This invention relates to a sweep circuit, and more particularly, it relates to a self-oscillating sweep circuit.

In driving a sweep circuit for purposes of deflecting an electron beam in a cathode ray tube, it has been found advantageous to utilize a single electron discharge device as an oscillator and an amplifier. In one approach to a single discharge device sweep circuit, disclosed in copending application Ser. No. 760,648, filed Sept. 18, 1968, assigned to the assignee of the present invention, the ringing in a feedback winding due to third harmonic ringing is utilized to initiate retrace by self-exciting the discharge device. The self-excitation is achieved by connecting a feedback winding means to the control electrode of a discharge device through a diode which remains reverse biased during trace and to a capacitive means. When the feedback winding means is appropriately coupled to the output transformer, the ringing in the feedback winding will forward bias the diode in the absence of the sync pulse, thereby charging the capacitor negative, in order to initiate retrace.

It must be appreciated that the appropriate ringing is achieved in the above-described circuit if the feedback winding means and the output transformer are carefully tuned for the appropriate third harmonic. Of course, this careful tuning, is, under some circumstances, difficult to achieve without increasing output transformer and feedback winding costs. In fact, in certain instances, it is conceivable that the increased cost of the output transformer and feedback winding means might outweight the economic advantages in utilizing a single discharge device to perform both amplification and oscillation functions. Furthermore, the magnitude of the ringing may in some cases be so small so as to require rather close tolerances between the states of forward and reverse bias on the diode. Under such circumstances, the diode may be prematurely forward biased by ambient noise so as to prematurely initiate retrace, a rather unsatisfactory condition.

SUMMARY OF THE INVENTION

It is therefore an object of this invention to achieve a self-oscillating sweep circuit.

It is a further object of this invention to achieve a self-oscillating sweep circuit which does not rely upon the ringing of a transformer due to third harmonic tuning in order to initiate retrace.

It is a still further object of this invention to achieve a self-oscillating sweep circuit which is substantially immune from the initiation of a premature retrace due to ambient noise.

In summary, in one embodiment of the invention, there is provided a sweep circuit for use in a deflection system of a cathode ray tube, comprising an electron discharge device, output means coupled to the output electrode of the electron discharge device, and an improved feedback means coupled between the output means and the control electrode of the electron discharge device. The improved feedback means comprises a ringing circuit, non-linear resistive means, and a capacitor capable of initiating retrace of the sweep circuit in the absence of a pulse from a synchronous pulse producing means.

BRIEF DESCRIPTION OF THE DRAWINGS

This specification concludes with claims particularly pointing out and distinctly claiming the subject matter which is regarded as the invention. The invention may also be understood from the following description taken in connection with the accompanying drawing which is a schematic diagram of the improved sweep circuit.

DESCRIPTION OF THE PREFERRED EMBODIMENT

The essence of the improved feedback means is the addition of a ringing circuit 34 in the feedback path of an electron discharge device 11. The ringing circuit which comprises a parallel capacitor 12 and variable inductor 13 combination couples a non-linear resistive means in the form of a diode 16 to a feedback winding means 14. The diode 16 is then connected to the junction of a capacitor 18 and the control or grid electrode 32 at the input of the discharge device 11. If the ringing circuit 34 is appropriately tuned by varying the reactance at the inductor 13, the ringing may provide an appropriate bias for the diode 16 so as to charge and discharge the capacitor 18 during retrace and trace respectively.

The remainder of the sweep circuit is somewhat conventional. More specifically, a synchronous pulse producing means 15 is coupled to the grid 32 through a capacitor 20. The bias of the grid is maintained through a resistor 21 in combination with the voltage dividing resistors **22*a* and 22*b* which are connected to the B+ power supply. In addition to providing the appropriate bias for the grid 32, the combination of resistors 21 and 22*a* provide a discharge path for the capacitor 18 during trace. The bias on the screen is maintained by connecting the B+ power supply thereto through a resistor 22*c***.

The circuitry at the output transformer or autotransformer 23 is also somewhat conventional. The high voltage rectifier 25 is connected at the top of the autotransformer 23 while the B+ damper diode 26, shunted by capacitor 27, is coupled to an intermediate point. The deflection coils 28 are connected across a segment of the autotransformer 23 so as to produce the appropriate sweep fields at the picture tube. As is customary, the deflection windings 28 are connected to ground through a deflection energy storage capacitor 35. Note that the autotransformer 23 and the feedback winding 14 are coupled with a reverse polarity on a common core.

The operation of the sweep circuit is believed to be as follows. At the beginning of trace, the capacitor 18 carries a negative charge so that the grid of the discharge device 11 is maintained at a negative potential. This condition is shown in the waveform associated with circuit point A and corresponds to time $t_1$. As the capacitor begins to discharge, the current flow through the anode 33 at the output of the discharge device 11 will increase through time $t_2$ so as to produce a sawtooth current waveform for the output transformer 23. Concurrently, the voltage waveforms existing at circuit points B and C comprise a substantially constant voltage and a ringing waveform superimposed upon the constant voltage respectively. At time $t_3$, the ringing waveform at circuit point C is going relatively negative as compared to the waveform at point A. As a consequence, the diode 16 will be forward biased setting up a regenerative action which results in a negative going pulse at points A, B, and C at time $t_4$. In addition, saturation of the tube 13 creates a negative pulse due to *di/dt* which supplements the negative going pulse.

As set forth in the copending application, Ser. No. 760,648, there will always be some ringing present due to third harmonics in the transformer 23 and the feedback winding means. In fact, it is that ringing which initiates retrace in the circuit disclosed in that copending application. However, if the magnitude of the ringing in the ringing circuit 34 is substantially greater than the ringing in the transformer 23 and the feedback winding means 14, the diode 16 may be arranged so as to only forward bias when the ringing of the circuit 34 is in the right phase. In addition, the fact that there is a larger signal available for effecting forward bias of the diode 16 renders the circuit more immune to ambient noise.

Of course, it is only necessary to depend upon the ringing in the circuit 34 for initiating retrace in the absence of a negative going pulse from the sync pulse producing means 15. If the pulse from the sync pulse producing means 15 is present and sufficiently early to precede the negative going position of the ringing at the end of trace, the grid will be driven negative so as to charge the capacitor 18 to the appropriate negative potential and prepare the circuit for trace.

In addition to providing an effective means for initiating retrace, the ringing circuit 34 provides a means for correcting other problems in the sweep circuit. For example, the variable nature of the inductor 13 allows utilization of sweep circuit components which might otherwise lie outside the tolerance of the circuit.

Although a specific embodiment of the invention has been shown, it is not desired that the invention be limited to any particular form described, and it is intended by the appended claims to cover all modifications within the spirit and scope of the invention.

What is claimed as new and desired to be secured by Letters Patent of the United States is:

1. A self-oscillating sweep circuit for a cathode ray tube including an electron discharge device having a control electrode and an output electrode, pulse producing means coupled to said control electrode, capacitive means coupled to said control electrode, an output transformer coupled to said output electrode, and feedback means comprising:

a feedback winding inductively coupled to said output transformer;

nonlinear resistive means having a first and a second end, said first end being coupled to said control electrode;

ringing circuit means connected between said second end of said nonlinear resistive means and said feedback winding for causing said capacitive means to be discharged through said nonlinear resistive means.

2. The apparatus as recited in claim 1 wherein said ringing circuit comprises a parallel combination inductor and capacitor.

3. The apparatus as recited in claim 2 wherein said nonlinear resistive means comprises a diode.

References Cited

UNITED STATES PATENTS

| | | | |
|---|---|---|---|
| 2,521,158 | 9/1950 | Gannaway et al. | 328—185 X |
| 2,926,284 | 2/1960 | Finkelstein et al. | 328—181 X |
| 3,340,423 | 9/1967 | Doland | 315—19 X |

ROY LAKE, Primary Examiner

S. H. GRIMM, Assistant Examiner

U.S. Cl. X.R.

315—29; 328—185; 331—148, 149, 151, 165, 172